Feb. 6, 1951         H. B. LAW         2,540,623
METHOD OF FORMING DIELECTRIC COATINGS
Filed March 12, 1947
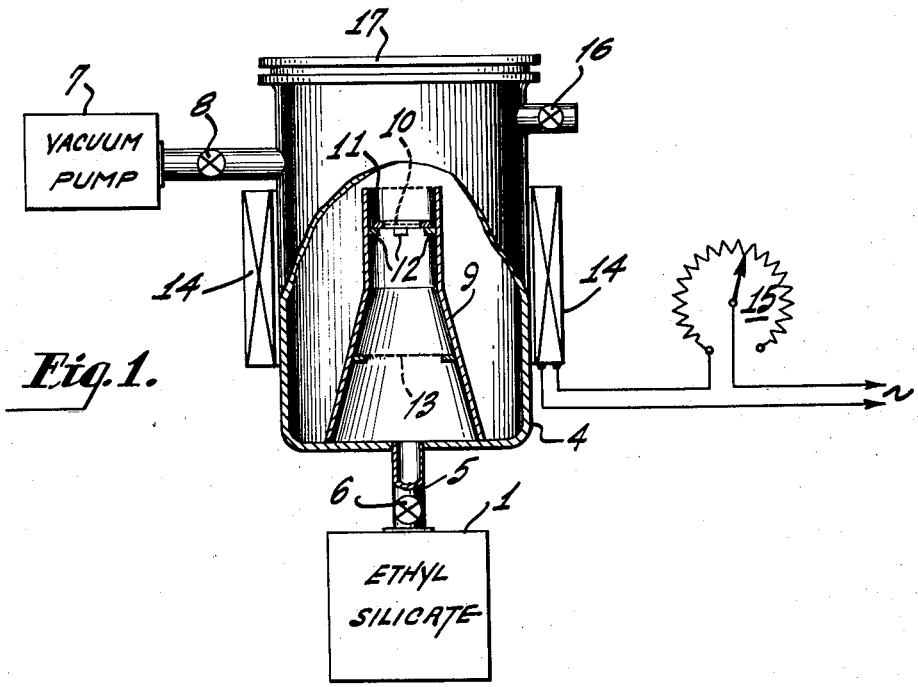
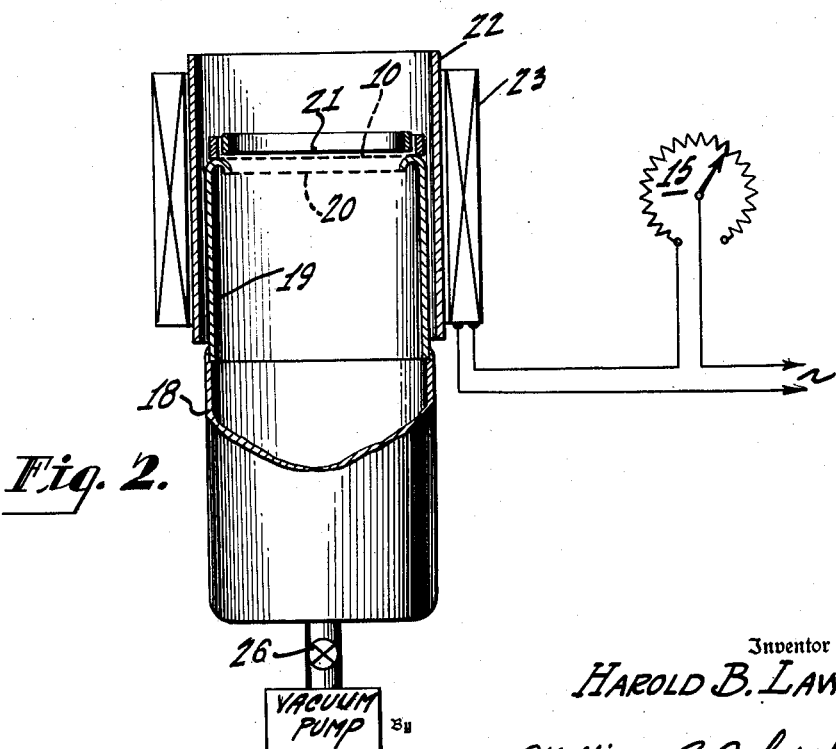
Inventor
HAROLD B. LAW
William A. Zalesak
Attorney Patented Feb. 6, 1951

2,540,623

UNITED STATES PATENT OFFICE 2,540,623

METHOD OF FORMING DIELECTRIC COATINGS

Harold B. Law, Princeton, N. J., assignor to Radio Corporation of America, a corporation of Delaware Application March 12, 1947, Serial No. 734,156

3 Claims. (Cl. 117—106)

This invention relates to the formation of film and layers of high dielectric strength on various objects such as targets of cathode ray beam tubes and parts associated therewith.

In cathode ray beam pickup tubes of the image orthicon type such as disclosed in the patent of Albert Rose, 2,403,239, July 2, 1946, a two-sided semi-conducting glass target is disclosed having the closely adjacent signal screen enameled to provide the desired insulation of the screen from the semi-conducting glass. In certain uses of cathode ray beam pickup tubes targets of reduced size are desirable and these require relatively high capacitance between the semi-conducting glass and the signal screen to obtain strong signals. Attempts have been made to obtain the high capacitance by thin enamel coatings and also by condensing insulating material from its vapor. Neither of these methods has been satisfactory for signal screens of 100 or more mesh per inch.

It is an object of this invention to provide a method of forming extremely thin films of insulation of high dielectric strength.

Another object is to provide a method of forming thin films of silica on conducting material.

Another object of the invention is to seal a film of glass to a silica coated signal screen.

Other objects of the invention will appear in the following specification, reference being had to the drawing in which:

Fig. 1 is a view of apparatus for carrying out the method; and

Fig. 2 is a view of apparatus for sealing a glass film to a silica coated screen.

Ethyl silicate $(C_2H_5)_4SiO_4$ is a liquid at normal temperature and at atmospheric pressure boils at 168° C. Its vapor decomposes rapidly at 950° C. to form silicon dioxide. Below this temperature the deposition is progressively slower. The character of the silica film seems to depend upon the condition of the surface and on the temperature of the object on which it deposits. Below about 850° C. the deposition rate is low but the deposited film has excellent insulating and protective qualities. Crystalline surfaces tend to induce the film of silica to crystallize as it is deposited thereon. Copper screens have a surface favorable to good film formation at 950° C. but if the deposition is carried out at temperatures much above this the coating is granular and is not so good as insulation or as a protective layer. If silica is to be deposited on nickel surfaces it is best to first deposit a silica film slowly around 850° and then continue the deposition at higher temperatures to obtain a good film at a faster rate of deposition. If a film is deposited directly on nickel at about 950° C. the coating is granular. I have also found that when a film of 0.1 mil or more of silica is deposited from the ethyl silicate vapor it tends to have fine cracks and to contract continually as the silica is deposited to obtain these relatively thick coatings. This appears to be due to the slight hydration of the silica from the water vapor released by the decomposition of the silicate and as this water of hydration is subsequently lost the film shrinks sufficiently to crack. In making insulated copper screens for cathode ray pick-up tubes such as in said Rose application the insulation thickness may be much below 0.1 mill and it is satisfactory to decompose the ethyl silicate vapor at about 950° to obtain the fast rate of deposition.

My improvement will be described in more detail in reference to the deposition of silica from ethyl silicate vapor at 950° C.

The method may be performed with different types of apparatus but in Fig. 1 I have shown one form that has proven successful. In this figure, the ethyl silicate is placed in a container 1 and its vapor enters the vacuum bottle 4 through tube 5. The boiling point of the ethyl silicate is lowered by the reduction in pressure and a copious supply of vapor enters bottle 4. The amount of vapor may be controlled by valve 6, diagrammatically shown. A vacuum pump indicated by block diagram 7 exhausts the air from bottle 4 so the ethyl silicate vapor may enter the bottle in substantial quantity. Valve 8 may be used to close the vacuum line when required.

A metal cylinder 9 open at both ends is positioned inside the vacuum bottle. The screen 10 which may have a peripheral frame 11 as disclosed in my application filed June 13, 1946, Ser. No. 676,391, now Patent No. 2,493,539, is placed inside the metal cylinder on suitable lugs 12. A baffle screen or perforated plate 13 is used to evenly distribute the silicate vapor in cylinder 9.

A high frequency heating coil 14 may be used to heat the screen 10 to the preferred temperature of 950° C. for decomposition of the ethyl silicate and deposition of the silica particles on the strands of the screen. The metal cylinder 9 is heated by the high frequency current and heats the screen inside to 950° C. so that the silica particles are formed and deposited on the screen 10. The heating current may be adjusted by rheostat 15. When the coating is applied, valve 16 may be opened and cover 17 removed.

vacuum then is produced in the vacuum bottle by adjustment of needle valve 26 to draw the softened glass film against the silica coating without puncturing the film. When cooled to room temperature the thin glass sections adhere to the wire strands around each mesh. The silica film protects the copper from oxidation in this process of attaching the glass film to the screen.

While certain specific embodiments have been illustrated and described, it will be understood that various changes and modifications may be made therein without departing from the spirit and scope of the invention.

What I claim as new is:

1. The method of forming a silica coating on the surface of a metal object, said method comprising the steps of, placing the metal object in a vacuum chamber, evacuating said chamber, surrounding said metal object with an atmosphere consisting of ethyl silicate vapor and heating said metal object to about 950° C. to decompose the ethyl silicate vapor adjacent the surface of said metal object to deposit a smooth and imperforate coating of silica thereon.

2. The method of forming a silica coating on the surface of a metal screen, said method comprising the steps of, exhausting the air from about said metal screen, surrounding said metal screen with an atmosphere consisting of ethyl silicate vapor, heating said metal screen to about 950° C. to decompose the ethyl silicate vapor adjacent the surface of said metal screen to deposit a smooth imperforate coating of silica thereon.

3. The method of forming a silica coating on the surface of a metal object, said method comprising the steps of, exhausting air from about said metal object, surrounding said metal object with an atmosphere consisting of ethyl silicate vapor, heating said metal object to a temperature of about 850° C. to deposit a thin film of silica thereon, and continuing the heating of said metal object in said ethyl silicate vapor to a temperature about 950° C. to decompose the ethyl silicate vapor adjacent the surface of said metal object to further deposit silicate as a smooth imperforate coating thereon.

HAROLD B. LAW.

REFERENCES CITED

The following references are of record in the file of this patent:

UNITED STATES PATENTS

| Number | Name | Date |
|---|---|---|
| 1,774,410 | Van Arkel | Aug. 26, 1930 |
| 1,964,322 | Hyde | June 26, 1934 |
| 1,991,487 | Bemis | Feb. 19, 1935 |
| 2,272,342 | Hyde | Feb. 10, 1942 |
| 2,364,436 | Frisch | Dec. 5, 1944 |
| 2,386,820 | Spencer | Oct. 16, 1945 |
| 2,442,976 | Heany | June 8, 1948 |
| 2,489,127 | Forgue | Nov. 22, 1949 |